(12) United States Patent
Bert

(10) Patent No.: US 11,354,147 B2
(45) Date of Patent: Jun. 7, 2022

(54) CLASS OF SERVICE FOR MULTI-FUNCTION DEVICES

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 357 days.

(21) Appl. No.: 16/547,932

(22) Filed: Aug. 22, 2019

(65) Prior Publication Data

US 2020/0356396 A1    Nov. 12, 2020

Related U.S. Application Data

(60) Provisional application No. 62/843,668, filed on May 6, 2019.

(51) Int. Cl.
*G06F 9/455* (2018.01)
*G06F 3/06* (2006.01)
(Continued)

(52) U.S. Cl.
CPC ........ *G06F 9/45545* (2013.01); *G06F 3/0607* (2013.01); *G06F 3/0658* (2013.01); *G06F 3/0665* (2013.01); *G06F 3/0679* (2013.01); *G06F 9/45558* (2013.01); *G06F 12/0246* (2013.01); *G06F 13/385* (2013.01);
(Continued)

(58) Field of Classification Search
CPC ................................ G06F 9/50; G06F 3/0614
See application file for complete search history.

(56) References Cited

U.S. PATENT DOCUMENTS

2012/0180047 A1    7/2012    Cardona et al.
2012/0284712 A1*   11/2012   Nimmagadda ....... G06F 9/5077
                                                         718/1
(Continued)

FOREIGN PATENT DOCUMENTS

KR    10-2016-0096279 A    8/2016

OTHER PUBLICATIONS

International Search Report and Written Opinion for International Application No. PCT/US2020/031144, dated Aug. 14, 2020, 9 pages.

*Primary Examiner* — Getente A Yimer
(74) *Attorney, Agent, or Firm* — Lowenstein Sandler LLP

(57) ABSTRACT

A processing device, operatively coupled with a memory component, is configured to provide a plurality of virtual memory controllers and to provide a plurality of physical functions, wherein each of the plurality of physical functions corresponds to a different one of the plurality of virtual memory controllers. The processing device further presents the plurality of physical functions to a host computing system over a peripheral component interconnect express (PCIe) interface, wherein each of the plurality of physical functions corresponds to a different virtual machine running on the host computing system, and manages input/output (IO) operations received from the host computing systems and directed to the plurality of physical functions, as well as background operations performed on the memory component, in view of class of service parameters associated with the plurality of physical functions.

16 Claims, 8 Drawing Sheets

(51) Int. Cl.
*G06F 12/02* (2006.01)
*G06F 13/38* (2006.01)

(52) U.S. Cl.
CPC .............. *G06F 2009/45579* (2013.01); *G06F 2213/0026* (2013.01)

(56) References Cited

U.S. PATENT DOCUMENTS

| | | | | |
|---|---|---|---|---|
| 2014/0242945 | A1* | 8/2014 | Zeng | G06F 21/53 455/410 |
| 2015/0317088 | A1* | 11/2015 | Hussain | G06F 9/50 711/103 |
| 2016/0127492 | A1* | 5/2016 | Malwankar | G06F 3/0614 709/212 |
| 2016/0147687 | A1* | 5/2016 | Check | G06F 13/372 710/117 |
| 2017/0277573 | A1 | 9/2017 | Huynh | |
| 2021/0173589 | A1* | 6/2021 | Benisty | G06F 3/0604 |

\* cited by examiner

CLASS OF SERVICE FOR MULTI-FUNCTION DEVICES

RELATED APPLICATIONS

This application claims the benefit of U.S. Provisional Patent Application No. 62/843,668, filed May 6, 2019, the entire contents of which are hereby incorporated by reference herein.

TECHNICAL FIELD

The present disclosure generally relates to a memory system, and more specifically, relates to the use of class of service parameters for multi-function memory devices.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
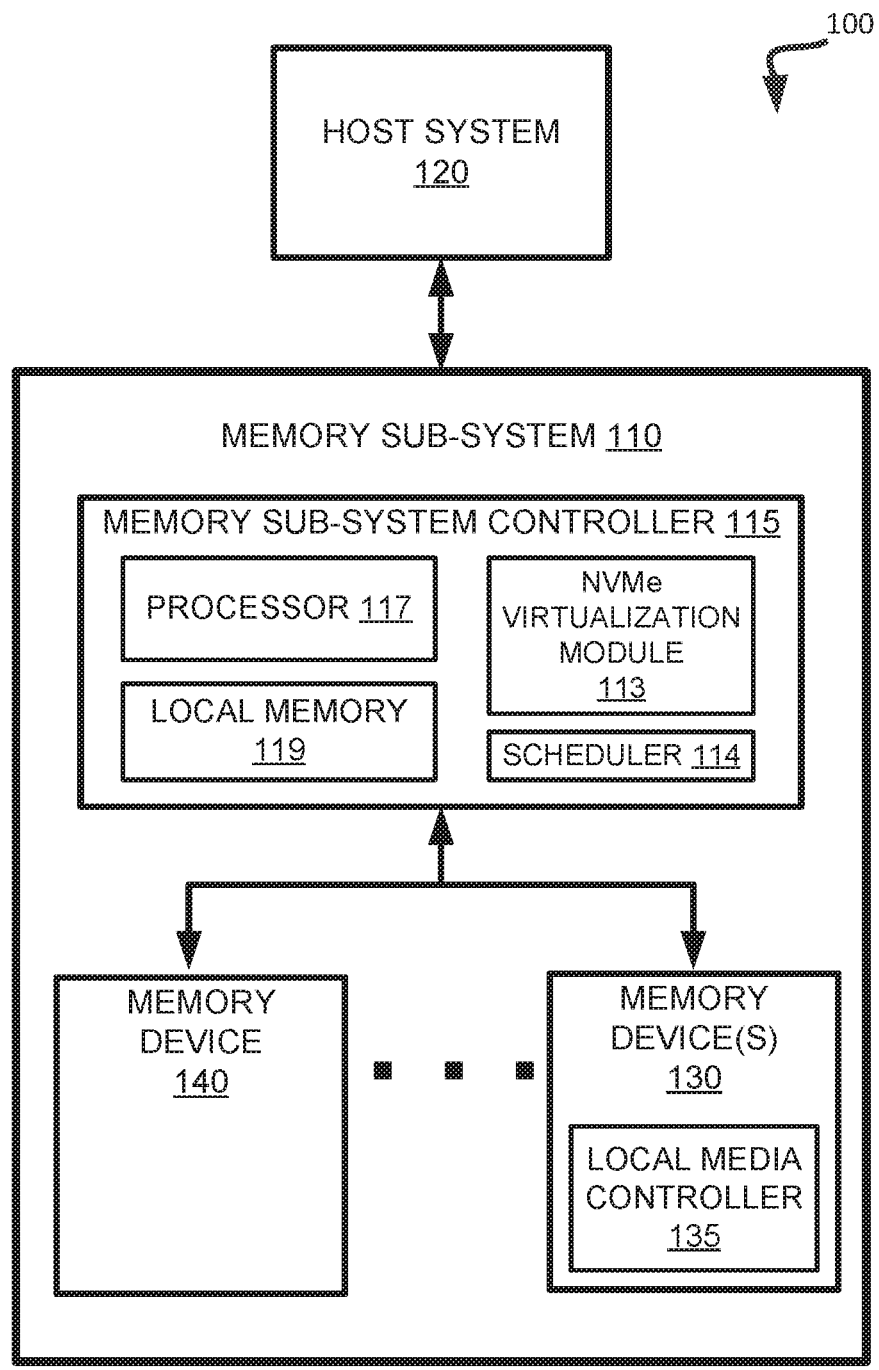
FIG. 1 illustrates an example computing environment for NVMe direct virtualization and class of service management in accordance with some embodiments of the present disclosure.

Aspects of the present disclosure are directed to the use of class of service parameters for multi-function memory devices in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

The evolution of server architecture and the availability of multi-core processors has encouraged significant changes to server design. Most notably, servers running a single operating system (OS) have been replaced by multi-tenants servers, where a number of "owners" (e.g., guest operating systems running in virtual machines (VMs), containers, or microservices) share the same physical server platform, unaware of the existence of each other.

Connecting input/output (I/O) devices to each VM can problematic and resource intensive, so special architectures have evolved to simplify the connection process and maximize performance. Certain conventional memory-subsystems utilize the single root input/output virtualization (SR-IOV) specification. SR-IOV is a specification that allows the isolation of peripheral component interconnect (PCI) Express (PCIe) resources among various hardware functions for manageability and performance reasons, while also allowing single physical PCIe devices to be shared in a virtual environment. SR-IOV offers different virtual functions to different virtual components (e.g., a network adapter) on a physical server machine. SR-IOV also allows different virtual machines in a virtual environment to share a single PCIe hardware interface. Alternatively, an equivalent capability can be offered by a number of parallel Physical Functions, called "Multi-PF." The Multi-PF architecture maps each physical function (PF) to a VM. A physical function allows enumeration of a number of physical functions and a hypervisor can then assign those physical functions to one or more virtual machines. These solutions require both a Host OS in charge of doing enumeration and resource assignment, and a set of Guest OSs, running on virtual machines, which will be in charge of the regular data flow. The Host OS can be aware of such capabilities and identify special functions to be added to the Host OS. In addition, most hypervisor environments do not support SR-IOV, making that solution inapplicable to many situations. Furthermore, in many circumstances, each VM can have a Service Level Agreement (SLA) defining a certain level of service, including quality, availability, responsibilities, etc. that is to be provided.

Aspects of the present disclosure address the above and other deficiencies by having a memory sub-system that provides a mechanism so that each VF and/or PF of the controller can provide a different Quality of Service (QoS) so as to meet the conditions of the system SLA. In one implementation, the memory sub-system defines certain QoS parameters pertaining to input/output operations per second (IOPS) and throughput by allowing the system to set both a minimum (i.e., "Reserve") and a maximum (i.e., "Limit") of such QoS conditions.

When utilizing such QoS parameters in a memory sub-system utilizing NAND-based memory and similar devices, there are certain considerations to address. For example, NAND writes (programs) are slow and asynchronous and can interfere with incoming system IOs, potentially impacting the QoS. In addition, on NAND devices, data is often moved around as part of wear leveling operations and conflicts with incoming data are generally unpredictable. Also, the memory sub-system can perform certain background operations (e.g., garbage collection, media scans, wear leveling) that may impact IO on unpredictable levels. NAND erase and program operations are both high impact operations, as they lock down the entire die when active, and are also very slow (e.g., 10×-30× slower than reads) so IOs that impact such die can be considerably delayed. Furthermore, NAND erase and program operations have a suspend/resume capability, but that will impact all other IOs so a scheme can be utilized to manage their use.

In one implementation, the memory sub-system uses a non-volatile memory express (NVMe) virtualization schema to allow cloud computing services which do not natively support SR-IOV to be dynamically configured. This solution provides physical functions that are naturally visible to a host operating system or virtual machines running thereon, and does not rely on software translation performed by the hypervisor and PCIe. In one implementation, firmware or other logic, such as an NVMe virtualization module in the memory sub-system generates a number of virtual NVMe controllers. Each virtual NVMe controller has a corresponding PCIe physical function, causing each virtual NVMe controller to appear as a separately addressable PCIe device (i.e., a physical controller) connected to the PCIe bus between the memory sub-system and the host system. Thus, there may be only a single underlying storage device in the memory sub-system that appears, by virtue of the multiple virtual NVMe controllers, as multiple individual storage devices to the host system connected via the PCIe bus. In another embodiment, there may be multiple underlying storage devices in the memory sub-system that are presented as some greater number of storage devices, represented by the virtual NVMe controllers.

The NVMe virtualization techniques described herein allow a memory sub-system connected to a PCIe bus that would normally appear as a single PCIe device to present itself as multiple separately addressable PCIe devices. The use of virtual NVMe controllers, each having a corresponding physical function, eliminates the need for additional physical controllers in the memory sub-system and the additional hardware resources that would normally be associated with such physical controllers. In addition, NVMe virtualization allows for the performance associated with the SR-IOV specification, including the ability for different virtual machines in a host system to share a single PCIe interface with the memory sub-system, in environments that do not natively support SR-IOV. Thus, instead of a PCIe root complex in the host system performing virtualization, the memory sub-system itself can implement the virtualization without the need for a hypervisor or other software involvement from the host system. The host system sees each physical function as a separate physical storage device which can be assigned to the host operating system or one of multiple virtual machines running thereon. In this manner, a single underlying storage resource can be shared by multiple entities on the host in a completely transparent fashion. Furthermore, each physical function and virtual NVMe controller pair can have a number of associated QoS parameters, including one referred to herein the Class of Service (CoS). The CoS parameter may be a 4-bit value for example (0x0-0xF) which describes the level of impact of all activities on IOs from the related virtual and physical functions. The CoS parameter can define how the memory sub-system will treat pending host access commands, new host access commands, and all of the background operations performed in the memory-sub-system. Additional details of these techniques are provided below with respect to FIGS. 1-8.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A 3D cross-point memory device a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Each of the memory devices 130 can include one or more arrays of memory cells such as single level cells (SLCs), multi-level cells (MLCs), triple level cells (TLCs), or quad-level cells (QLCs). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped to form pages that can refer to a unit of the memory component used to store data. With some types of memory (e.g., NAND), pages can be grouped to form blocks. Some types of memory, such as 3D cross-point, can group pages across die and channels to form management units (MUs).

Although non-volatile memory components such as NAND type flash memory and 3D cross-point are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. In some embodiments, the memory devices 130 are managed memory devices, which is a raw memory device combined with a local controller (e.g., local controller 135) for memory management within the same memory device package. An example of a managed memory device is a managed NAND (MNAND) device.

The memory sub-system 110 includes an NVMe virtualization module 113 that can be used to perform NVMe direct virtualization. In one embodiment, the NVMe virtualization module 113 executes firmware or other logic to provide a number of virtual NVMe controllers in memory sub-system 110. NVMe virtualization module 113 assigns a corresponding PCIe physical function to each virtual NVMe controller, causing each virtual NVMe controller to appear as a separately addressable PCIe device (i.e., a physical controller) connected to the PCIe bus between the memory sub-system 110 and the host system 120. Host system 120, including separate virtual machines or partitions running thereon, can thus access the memory devices 130 represented by a virtual NVMe controller separately and in parallel over the physical host interface (e.g., PCIe bus). Further details with regards to the operations of NVMe virtualization module 113 are described below.

The memory sub-system 110 further includes scheduler 114 that can manage storage operations pertaining to the different physical functions and virtual NVMe controllers in view of QoS parameters including the CoS parameter. As described above, the CoS parameter can define how the scheduler 114 will treat pending host access commands, new host access commands, and all of the background operations performed in the memory-sub-system 110. Scheduler 114 can associate a CoS parameter with each of the physical function and virtual NVMe controller pairs in the memory sub-system 110 to define how operations directed towards each pair will be treated relative to the others. In one implementation, not all 16 values possible for the 4-bit CoS parameter are defined. For example, in one implementation, scheduler 114 may consider three values: 0x0 indicating the highest priority where no QoS impact is permitted; 0x8 indicating standard behavior where QoS is not considered; and 0xF indicating the lowest priority where pending operations from other physical functions and/or background operations will take precedence. In other implementations, there may be any other number of CoS parameters defined, such as for example, 0x4 indicating a medium-high priority or 0xC indicating a medium-low priority. Further details with regards to the operations of scheduler 114 are described below.

Figure 2:
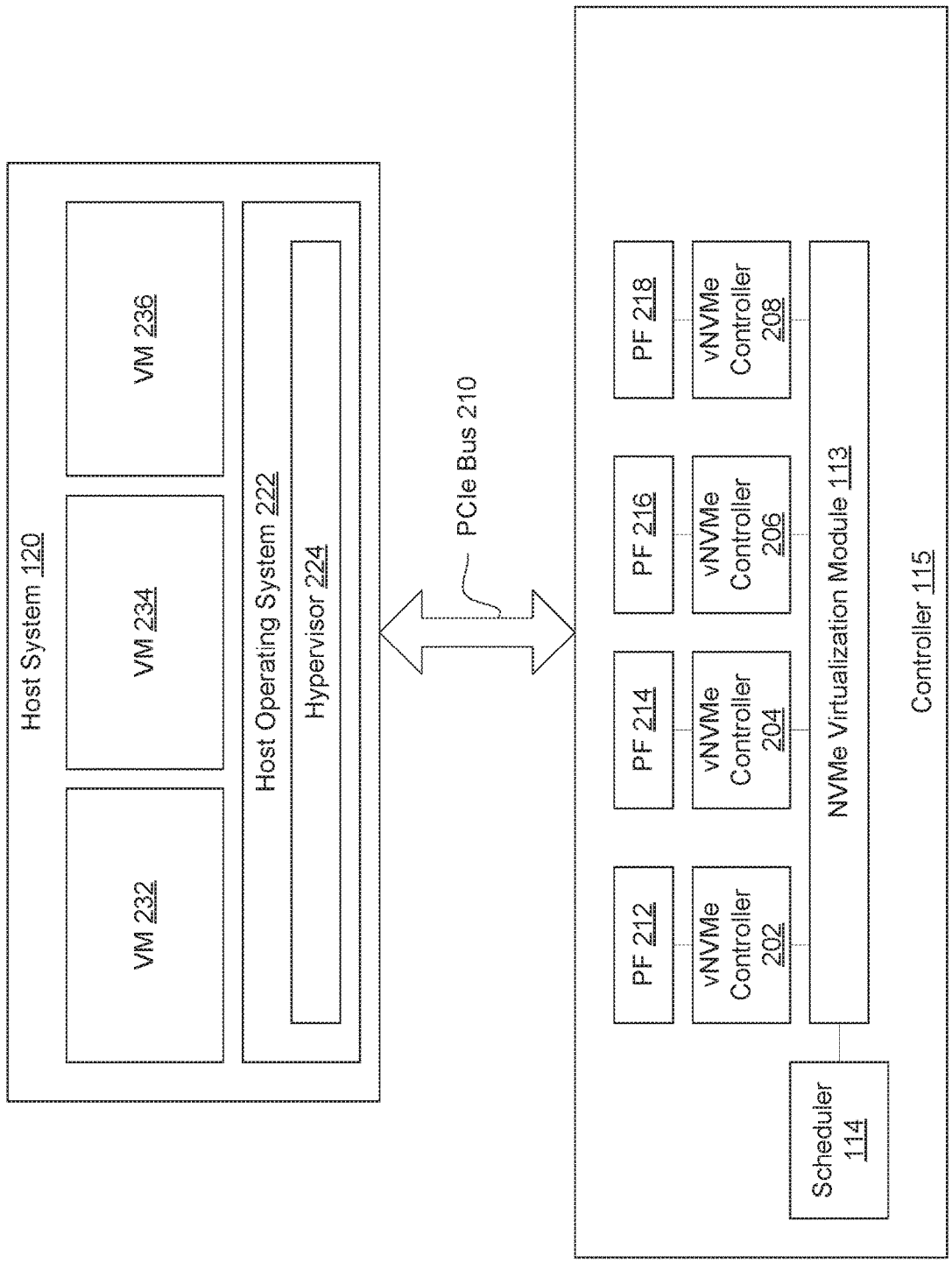
FIG. 2 illustrates an example physical host interface between a host system and a memory sub-system implementing NVMe direct virtualization and class of service management in accordance with some embodiments of the present disclosure.

FIG. 2 illustrates an example physical host interface between a host system and a memory sub-system implementing NVMe direct virtualization and class of service management in accordance with some embodiments of the present disclosure. In one embodiment, the controller 115 of memory sub-system 110 is connected to host system 120 over a physical host interface, such as PCIe bus 210. In one embodiment, the NVMe virtualization module 113 running on controller 115 generates and manages a number of virtual NVMe controllers 202-208 within controller 115. The virtual NVMe controllers 202-208 are virtual entities that appear as physical controllers to other devices, such as host system 120, connected to PCIe bus 210 by virtue of a physical function 212-218 associated with each virtual NVMe controller 202-208. FIG. 2 illustrates four virtual NVMe controllers 202-208 and four corresponding physical functions 212-218. In other embodiments, however, there may be any other number of NVMe controllers, each having a corresponding physical function. All of the virtual NVMe controllers 202-208 have the same priority and same functionality. Thus, there is no primary or secondary controller concept in contrast to SR-IOV, where a primary controller can create secondary controllers when the primary controller is in an operational state. This means that at the boot time, an SR-IOV/system will not see any secondary controllers until the primary controller driver creates them.

Each of virtual NVMe controllers 202-208 manages storage access operations for the underlying memory device 130. For example, virtual NVMe controller 202 may receive data access requests from host system 120 over PCIe bus 210, including requests to read, write, or erase data. In response to the request, virtual NVMe controller 202 may identify a physical memory address in memory device 130 pertaining to a logical memory address in the request, perform the requested memory access operation on the data stored at the physical address and return requested data and/or a confirmation or error message to the host system 120, as appropriate. Virtual NVMe controllers 204-208 may function in the same or similar fashion with respect to data access requests for memory device 130.

As described above, NVMe virtualization module 113 associates one of physical functions 212-218 with each of virtual NVMe controllers 202-208 in order to allow each virtual NVMe controller 202-208 to appear as a physical controller on PCIe bus 210. For example, physical function 212 may correspond to virtual NVMe controller 202, physical function 214 may correspond to virtual NVMe controller 204, physical function 216 may correspond to virtual NVMe controller 206, and physical function 218 may correspond to virtual NVMe controller 208. Physical functions 212-218 are fully featured PCIe functions that can be discovered, managed, and manipulated like any other PCIe device, and thus can be used to configure and control a PCIe device (e.g., virtual NVMe controllers 202-208). Each physical function 212-218 can have some number virtual functions associated with therewith. The virtual functions are lightweight PCIe functions that share one or more resources with the physical function and with virtual functions that are associated with that physical function. Each virtual function has a PCI memory space, which is used to map its register set. The virtual function device drivers operate on the register set to enable its functionality and the virtual function appears as an actual PCIe device, accessible by host system 120 over PCIe bus 210.

As noted above, each physical function 212-218 can be assigned to any one of virtual machines 232-236 in the host system 120. When I/O data is received at a virtual NVMe controller 202-208 from a virtual machine 232-236, a virtual machine driver provides a guest physical address for a corresponding read/write command. NVMe virtualization module 113 translates the physical function number to a bus, device, and function (BDF) number and then adds the command to a direct memory access (DMA) operation to perform the DMA operation on the guest physical address. In one embodiment, controller 115 further transforms the guest physical address to a system physical address for the memory sub-system 110.

Furthermore, each physical function 212-218 may be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QoS) provisioning, firmware and controller updates, vendor unique statistics and events, diagnostics, secure erase/encryption, among others. Typically, a first physical function can implement a privileged mode and the remainder of the physical functions can implement a normal mode. In other embodiments, however, any of the physical functions can be configured to operate in the privileged mode. Accordingly, there can be one or more functions that run in the privileged mode.

Host system 120 runs multiple virtual machines 232, 234, 236, by executing a software layer 224, often referred to as "hypervisor," above the hardware and below the virtual machines, as schematically shown in FIG. 2. In one illustrative example, the hypervisor 224 may be a component of a host operating system 222 executed by the host system 120. Alternatively, the hypervisor 224 may be provided by an application running under the host operating system 222, or may run directly on the host system 120 without an operating system beneath it. The hypervisor 224 may abstract the physical layer, including processors, memory, and I/O devices, and present this abstraction to virtual machines 232, 234, 236 as virtual devices, including virtual processors, virtual memory, and virtual I/O devices. Virtual machines 232, 234, 236 may each execute a guest operating system which may utilize the underlying virtual devices, which may, for example, map to the memory device 130 managed by one of virtual NVMe controllers 202-208 in memory sub-system 110. One or more applications may be running on each virtual machine under the guest operating system.

Each virtual machine 232, 234, 236 may include one or more virtual processors. Processor virtualization may be implemented by the hypervisor 224 scheduling time slots on one or more physical processors such that from the guest operating system's perspective, those time slots are scheduled on a virtual processor. Memory virtualization may be implemented by a page table (PT) which is a memory structure translating guest memory addresses to physical memory addresses. The hypervisor 224 may run at a higher privilege level than the guest operating systems, and the latter may run at a higher privilege level than the guest applications.

In one implementation, there may be multiple partitions on host system 120 representing virtual machines 232, 234, 236. A parent partition corresponding to virtual machine 232 is the root partition (i.e., root ring 0) that has additional privileges to control the life cycle of other child partitions (i.e., conventional ring 0), corresponding, for example, to virtual machines 234 and 236. Each partition has corresponding virtual memory, and instead of presenting a virtual device, the child partitions see a physical device being assigned to them. When host system 120 initially boots up, the parent partition can see all of the physical devices directly. The pass through mechanism (e.g., PCIe Pass-Through or Direct Device Assignment) allows the parent partition to assign an NVMe device (e.g., one of virtual NVMe controllers 202-208) to the child partitions. The associated virtual NVMe controllers 202-208 may appear as a virtual storage resource to each of virtual machines 232, 234, 236, which the guest operating system or guest applications running therein can access. In one embodiment, for example, virtual machine 232 is associated with virtual NVMe controller 202, virtual machine 234 is associated with virtual NVMe controller 204, and virtual machine 236 is associated with virtual NVMe controller 206. In other embodiments, one virtual machine may be associated with two or more virtual NVMe controllers. The virtual machines 232, 234, 236, can identify the associated virtual NVMe controllers using a corresponding bus, device, and function (BDF) number, as will be described in more detail below.

In one embodiment, NVMe virtualization module 113 further implements access control services for each of virtual NVMe controllers 202-208. The access control services manage what devices have access permissions for the virtual NVMe controllers 202-208. The access permissions can define, for example, which of virtual machines 232-236 on host system 120 can access each of virtual NVMe controllers 202-208, as well as what operations each of virtual machines 232-236 can perform on each of virtual NVMe controllers 202-208. In one embodiment, NVMe virtualization module 113 controls access permissions for each of virtual NVMe controllers 202-208 individually. For example, in the privileged mode, NVMe virtualization module 113 may grant virtual machine 232 permission to read and write data using virtual NVMe controller 202, but only permission to read data using virtual NVMe controller 204. Similarly, in the privileged mode, NVMe virtualization module 113 may grant virtual machine 232 permission to read and write data using virtual NVMe controller 204 only. Any combination of access permissions may be defined for virtual NVMe controllers 202. When a memory access request is received for one of virtual NVMe controllers 202-208, NVMe virtualization module 113 may analyze the conditions of the request (e.g., requestor, target, operation, requested data address, etc.) based on access policies defining the access control services. The access policies may be stored in local memory 119. If the request satisfies the corresponding access policy (the conditions of the request match conditions specified in the corresponding access policy), NVMe virtualization module 113 may grant the access request. Otherwise, the request may be denied.

In one implementation, scheduler 114 manages host IO operations and background operations directed to physical functions 212-218 according to various QoS parameters, including the CoS parameter. Table 1 illustrates how scheduler 114 performs such management for a given IO operation or background operation (BG) with respect to existing IO operations from other physical functions, new IO operations from other physical functions, existing background operations and new background operations. Thus, the CoS parameter can define a priority execution order for a given IO operation directed to a first physical function or a background operation with respect to other operations in the memory sub-system.

TABLE 1

| Setting | Priority | Existing IO from other VF/PF | New IO from other VF/PF | Existing BG operations | New BG operations |
|---|---|---|---|---|---|
| 0x0 | Highest | Immediate Suspend | Delayed until current is complete | Immediate Suspend | Not scheduled |
| 0x4 | Med-High | Read: let complete Write/Erase: wait for 1xtR, then suspend | Read & Write: wait, unless higher CoS | wait for 1xtR, then suspend | Wait to schedule until complete |
| 0x8 | Standard | No action as in current SSD | Schedule based on their CoS | Keep running | Schedule as per FTL design |
| 0xC | Med-Low | Read: let complete Write: wait for 5xtR, then suspend | Read: takes precedence Write: wait 5tR than suspend | Scan: takes precedence Write: wait 1tR than suspend | Scan: takes precedence Write: wait 1tR than issue |
| 0xF | Lowest | Read: let complete Write: wait for 10xtR, then suspend | Read: takes precedence Write: wait 5tR than suspend | Scan: takes precedence Write: wait 5tR than suspend | Scan: takes precedence Write: wait 5tR than issue |

For example, if physical function 212 is assigned a CoS parameter setting of 0x0, indicating the highest priority, scheduler 114 can prioritize IO operations directed to physical function 212. Thus, if there is an existing IO operation being executed for another physical function 214 having a lower CoS priority (e.g., 0x8) that is directed to the same segment of an underlying memory component (e.g., memory device 130), scheduler 114 can suspend that existing IO operation so that the IO operation directed to physical function 212 can be performed. If a new IO operation directed to physical function 214 is received while an IO operation directed to physical function 212 is being executed, scheduler 114 can delay that new IO operation until the current IO operation is complete. Similarly if existing background operations are being executed on the relevant segment of memory device 130, scheduler 114 can suspend those existing background operations so that the IO operation directed to physical function 212 can be performed. New background operations are also not scheduled on the relevant segment of memory device 130 while the IO operation directed to physical function 212 can is being performed.

If physical function 214 is assigned a CoS parameter setting of 0x8, indicating a standard priority, scheduler 114 can manage IO operations directed to physical function 214 accordingly. If there is an existing IO operation being executed for another physical function 216 having a lower CoS priority (e.g., 0xF) that is directed to the same segment of memory device 130, scheduler 114 can allow that existing IO operation to complete before performing the IO operation directed to physical function 214. Thus, scheduler 114 takes no action with respect to the CoS priority and performs the IO operations in the order in which they are received. If a new IO operation directed to physical function 212 is received while an IO operation directed to physical function 214 is being executed, scheduler 114 can suspend the current IO operation and perform that new IO operation. If a new IO operation directed to physical function 216 is received while an IO operation directed to physical function 214 is being executed, scheduler 114 can delay that new IO operation until the current IO operation is complete. Similarly if existing background operations are being executed on the relevant segment of memory device 130, scheduler 114 can continue running those existing background operations and perform the IO operation directed to physical function 212 once the background operations are complete. New background activities are scheduled on the relevant segment of memory device 130 according to the normal scheduling scheme.

If physical function 216 is assigned a CoS parameter setting of 0xF, indicating a lowest priority, scheduler 114 can manage IO operations directed to physical function 216 accordingly. If there is an existing read IO operation being executed for another physical function that is directed to the same segment of memory device 130, scheduler 114 can allow that existing read IO operation to complete before performing the new IO operation directed to physical function 216. If there is an existing write IO operation being executed for the other physical function, scheduler 114 can allow that existing write IO operation to proceed for some threshold period of time (e.g., 10xtR) before suspending that existing write IO operation and performing the new IO operation directed to physical function 216. If a new IO operation directed to physical function 216 is received while an existing read IO operation directed to the other physical function is being executed, scheduler 114 can delay that new IO operation until the current read IO operation is complete. If a new IO operation directed to physical function 216 is received while an existing write IO operation directed to the other physical function is being executed, scheduler 114 can allow that existing write IO operation to proceed for some threshold period of time (e.g., 5xtR) before suspending that existing write IO operation and performing the new IO operation directed to physical function 216. Similarly if an existing background scan operation is being executed on the relevant segment of memory device 130, scheduler 114 can delay the new IO operation until the existing background scan operation is complete. If an existing background write operation is being executed on the relevant segment of memory device 130, scheduler 114 can allow that existing background write operation to proceed for some threshold period of time (e.g., 5xtR) before suspending that existing background write operation and performing the new IO operation directed to physical function 216. Scheduler 114 can give a new background scan operation precedence over an existing IO operation directed to physical function 216 and can allow that existing IO operation to proceed for some threshold period of time (e.g., 5xtR) before suspending that existing IO operation and performing a new background write operation.

In another implementation, the same CoS parameters described above can be used to define a weighted assignment of credits to each VF/PF and, if done properly, the same distribution can be enforced for IO flow. This is in contrast to conventional systems which have no credit distribution mechanism (i.e. they are served as "first come, first serve" style) and have no QoS capabilities. Some credits can be kept in reserve for any VM that has a "Reserve" field set and that will guarantee that a minimum capability is available but no real QoS across them. Not only will some credits be kept in reserve but the VF/PF with the most aggressive (i.e., lowest number) QoS parameter will be assigned a proportional number of credits. This will not only ensure that minimal "reserve" capacity is met, but also that enough credits are available proportional to the VF/PF QoS targets and they can be handed out based on the policies in Table 1.

Figure 3:
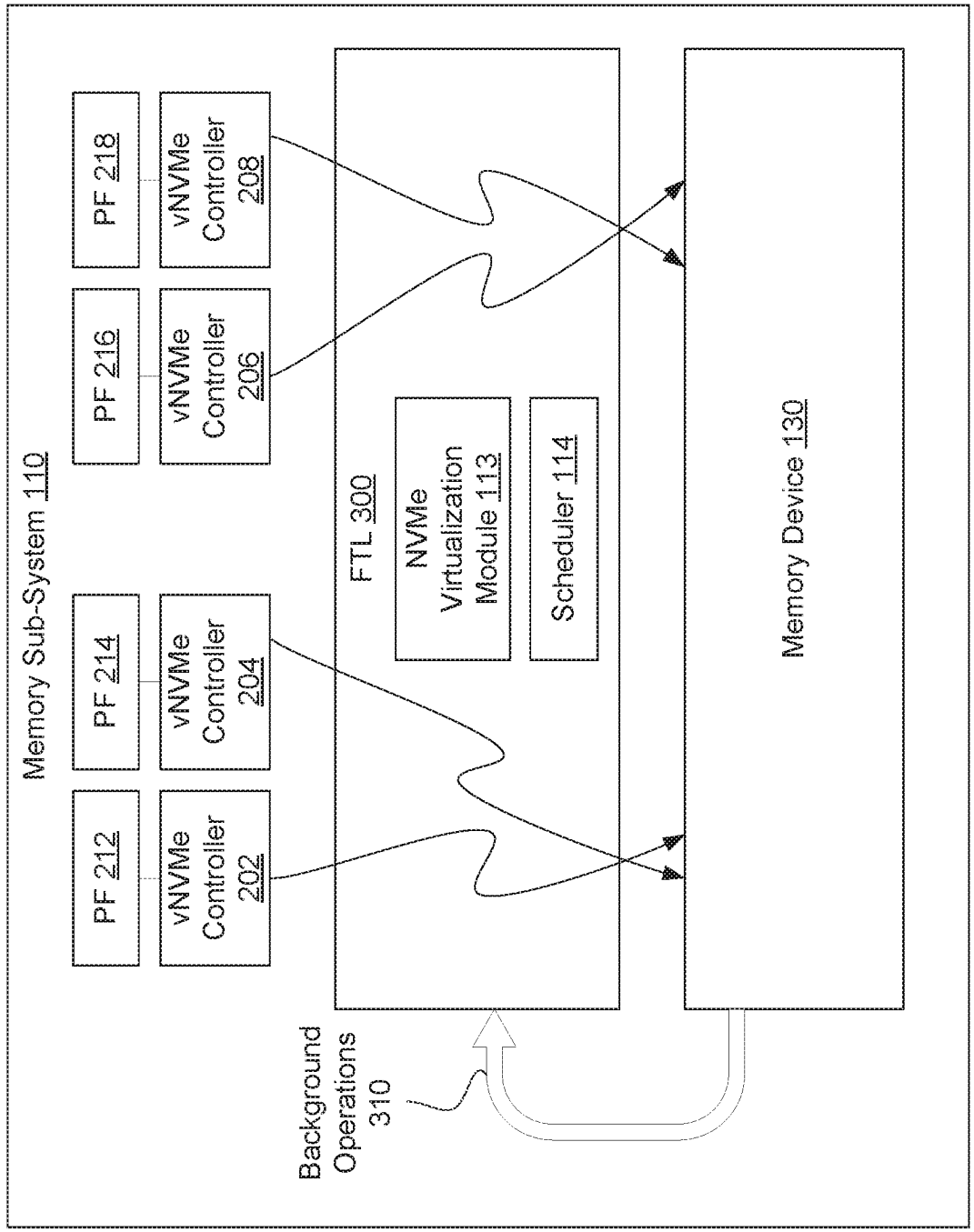
FIG. 3 illustrates memory mapping in memory sub-system for NVMe direct virtualization and class of service management in accordance with some embodiments of the present disclosure.

FIG. 3 illustrates memory mapping in memory sub-system 110 for NVMe direct virtualization and class of service management in accordance with some embodiments of the present disclosure. In one embodiment, memory sub-system 110 includes a Flash Translation Layer (FTL) 300, which may, for example, be implemented in memory sub-system controller 115. FTL 300 is responsible for logical-to-physical (L2P) address mapping and translation, wear leveling operations, bad block management, error detection and correction, and other operations. In one embodiment, FTL 300 includes NVMe virtualization module 113 and scheduler 114.

As described above, NVMe virtualization module 113 maps each NVMe controller in the memory sub-system 110 to one or more memory devices 130. In one embodiment, memory device 130 has a unique namespace. The namespace is a quantity of one or more memory devices 130 that can be formatted into logical blocks when memory components are configured with the NVMe protocol. The NVMe protocol provides access to the namespace, which appears as a standard-block device on which file systems and applications can be deployed without any modification. Each virtual NVMe controller 202-208 may have one or more separate namespaces, each identified by a unique namespace ID (NSID). In addition, there may be one or more shared namespaces that are accessible by two or more of virtual NVMe controllers 202-208.

In addition, each virtual NVMe controller 202-208 may also have an associated number of queue pairs. NVMe virtualization module 113 may have a fixed number of input/output (I/O) queue pairs and admin queue pairs which can be distributed among virtual NVMe controllers 202-208. The I/O queue pairs are used to receive memory access requests from host system 120 and the admin queue pairs are used to receive administrative commands. The number of I/O queue pairs assigned to each virtual NVMe controller 202-208 controls how many concurrent memory access requests can be received at the corresponding virtual NVMe controller. For example, if virtual NVMe controller 202 is assigned ten I/O queue pairs, virtual NVMe controller 202 can receive up to ten memory access requests from host system 120 before a subsequent request is denied. The memory access requests are held in the associated I/O queue pairs while a current request is being processed. Once virtual NVMe controller 202 has completed processing of the current request, a next request can be retrieved from the associated I/O queue pairs for processing, and another memory access request can be added to the queue. In one embodiment, NVMe virtualization module distributes the available I/O queue pairs evenly among virtual NVMe controllers 202-208. In another embodiment, the number of I/O queue pairs assigned to each virtual NVMe controller is not equal among different virtual NVMe controllers 202-208 and is based on some other factor, such as the level of past activity on the virtual NVMe controller. In any embodiment, each virtual NVMe controller is assigned at least one admin queue pair.

Each virtual NVMe controller can receive memory access requests (e.g., read requests or write requests) received from corresponding clients. FTL 300 and scheduler 114 can manage processing of the memory access requests, as well as background operations 310 in view of a number of QoS parameters associated with each virtual NVMe controller. The QoS parameters can include, for example, input/output operations per second (IOPS), throughput, and Class of Service (CoS). In one embodiment, the IOPS and throughput parameters can each have assigned a minimum (i.e., "Reserve") and a maximum (i.e., "Limit") value, indicating the specific performance requirements of the corresponding virtual NVMe controller. For example, the IOPS parameter can indicate a minimum and/or a maximum number of input/output operations that the associated virtual NVMe controller can perform per second. Similarly, the throughput parameter can indicate a minimum and/or a maximum amount of data that the associated virtual NVMe controller can process in a given period of time. As described above, the CoS parameter can define how to treat pending host access commands, new host access commands, and all of the background operations 310 performed in the memory-sub-system 110 relative to one another.

Figure 4:
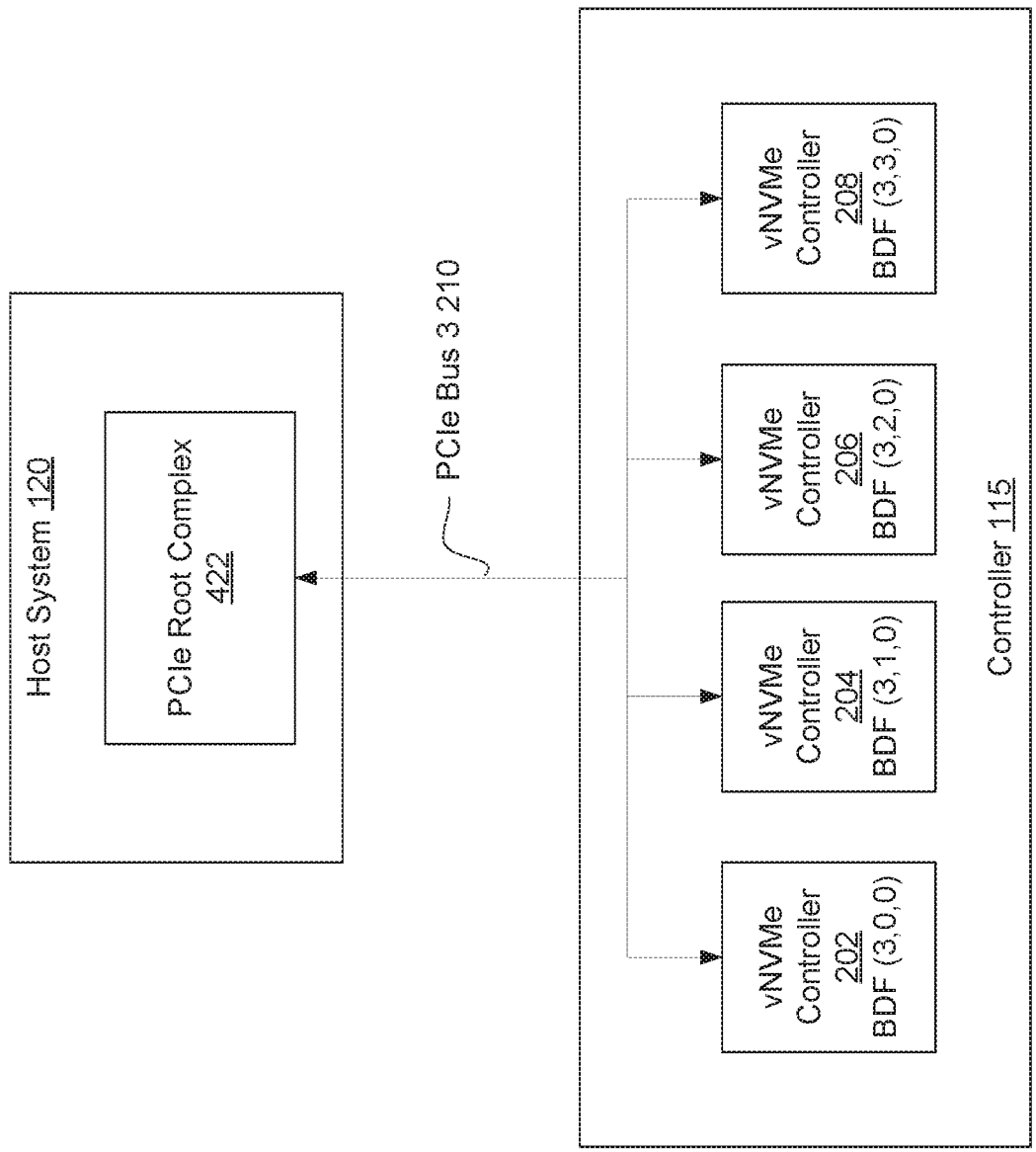
FIG. 4 illustrates a device hierarchy and topology for a memory sub-system with NVMe direct virtualization and class of service management in accordance with some embodiments of the present disclosure.

FIG. 4 illustrates a device hierarchy and topology for a memory sub-system with NVMe direct virtualization and class of service management in accordance with some embodiments of the present disclosure. In one embodiment, host system 120 include PCIe root complex 422 which serves as a connection between the physical and virtual components of host system 120 and the PCIe bus 210. PCIe root complex 422 can generate transaction requests on behalf of a processing device, such a virtual processing device in one of virtual machines 232, 234, 236. Depending on the embodiment, PCIe root complex 422 may be implemented as a discrete device or may be integrated with a physical processing device in host system 120. PCIe root complex 422 may have a number of communication ports such that PCIe root complex 422 can send and receive commands to/from multiple PCIe devices, such as virtual NVMe controllers 202-208 connected to PCIe bus 210.

As described above, each of virtual NVMe controllers 202-208 appears as a separate physical PCIe device connected to PCIe bus 210 by virtue of each having a separate physical function. Each physical function provides a corresponding configuration space for the corresponding one of virtual NVMe controllers 202-208. In one embodiment, each configuration space is 256 bytes long, and is addressable by knowing a corresponding bus, device, and function (BDF) number. The BDF number may include an eight-bit value indicating the PCIe bus, a five-bit value indicating the corresponding device, and three-bit value indicating the associated function. Thus, up to 256 buses, each with up to 32 devices, each supporting eight functions can be uniquely identified. In one embodiment, an alternative routing interpretation (ARI) may be used to increase the number of physical functions that can be implemented in a device up to 256 from the normal maximum of eight. In the example illustrated in FIG. 4, PCIe bus 210 is given a value of 3, and thus the BDF number of each of virtual NVMe controllers 202-208 includes the value of 3. In addition, each of virtual NVMe controllers 202-208 has a unique device value (in this case 0, 1, 2, and 3, respectively). Furthermore, since each of virtual NVMe controllers 202-208 has only a single physical function, each has a function value of 0. This results in each of virtual NVMe controllers 202-208 having a unique BDF number which PCIe root complex 422 can use to address the desired virtual NVMe controller. In one embodiment, controller 115 maintains a table or other data structure that maps each virtual NVMe controller's physical function number to a unique BDF. In addition, each physical function can create its own namespace (e.g., volume) with a namespace identifier (NSID). These NSIDs can start from 0 to N−1 for each function. The NSIDs may be unique across the memory sub-system 110, and in one embodiment, the physical function number is appended to the most significant bit of each NSID.

Figure 5:
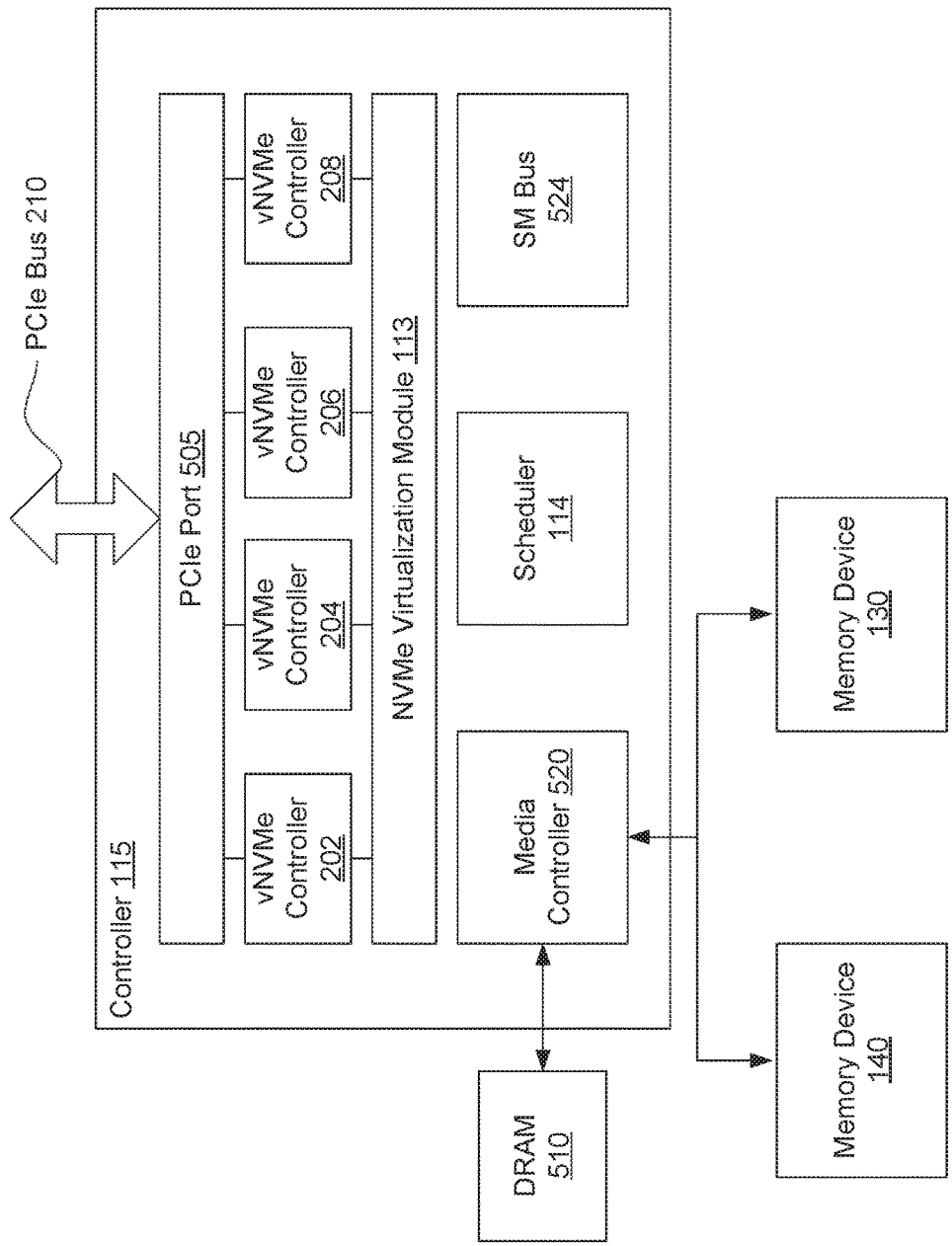
FIG. 5 illustrates a physical controller implementing NVMe direct virtualization and class of service management in accordance with some embodiments of the present disclosure.

FIG. 5 illustrates a physical controller implementing NVMe direct virtualization and class of service management in accordance with some embodiments of the present disclosure. As described above, controller 115 includes NVMe virtualization module 113 and virtual NVMe controllers 202-208. Virtual NVMe controllers 202-208 are coupled to PCIe port 505 which enables communications with host system 120 across PCIe bus 210. In one embodiment, controller 115 further includes media controller 520. Media controller 520 manages operations of storage media in the memory sub-system 110 including memory devices 130 and optionally volatile memory device 140, such as one or more dynamic random access memory (DRAM) devices 510. When one of virtual NVMe controllers 202-208 receives a request to access data in one of memory devices 130, for example, the virtual NVMe controller provides the request to media controller 520 which retrieves and returns the requested data, writes the requested data or erases the requested data from the memory devices 130.

In one embodiment, controller 115 further includes scheduler 114 and sideband management (SM) bus 524. Scheduler 114 can schedule IO operation and background operations to implement individual quality of service management for each virtual NVMe controller 202-208. To meet these requirements, each virtual NVMe controller 202-208 can have attached QoS. The QoS controls may include, for example, latency, bandwidth, class of service, or other characteristics. Scheduler 114 can monitor the performance of virtual NVMe controllers 202-208 over time and may reconfigure resource assignments as needed to ensure compliance with the QoS requirements.

SM bus 524 communicates with a platform manager (not shown), such as a baseboard management controller (BMC) in memory sub-system 110 to interface with platform hardware. The platform manager may interface with different types of sensors built into memory sub-system 110 to report on parameters, such as temperature, cooling fan speeds, power status, operating system status, etc. The platform manager monitors these sensors and can generate alerts if any of the parameters do not stay within certain pre-set limits, indicating a potential failure. Controller 115 may receive these alerts from the platform manager and/or provide status information to platform manager via SM bus 524.

Figure 6:
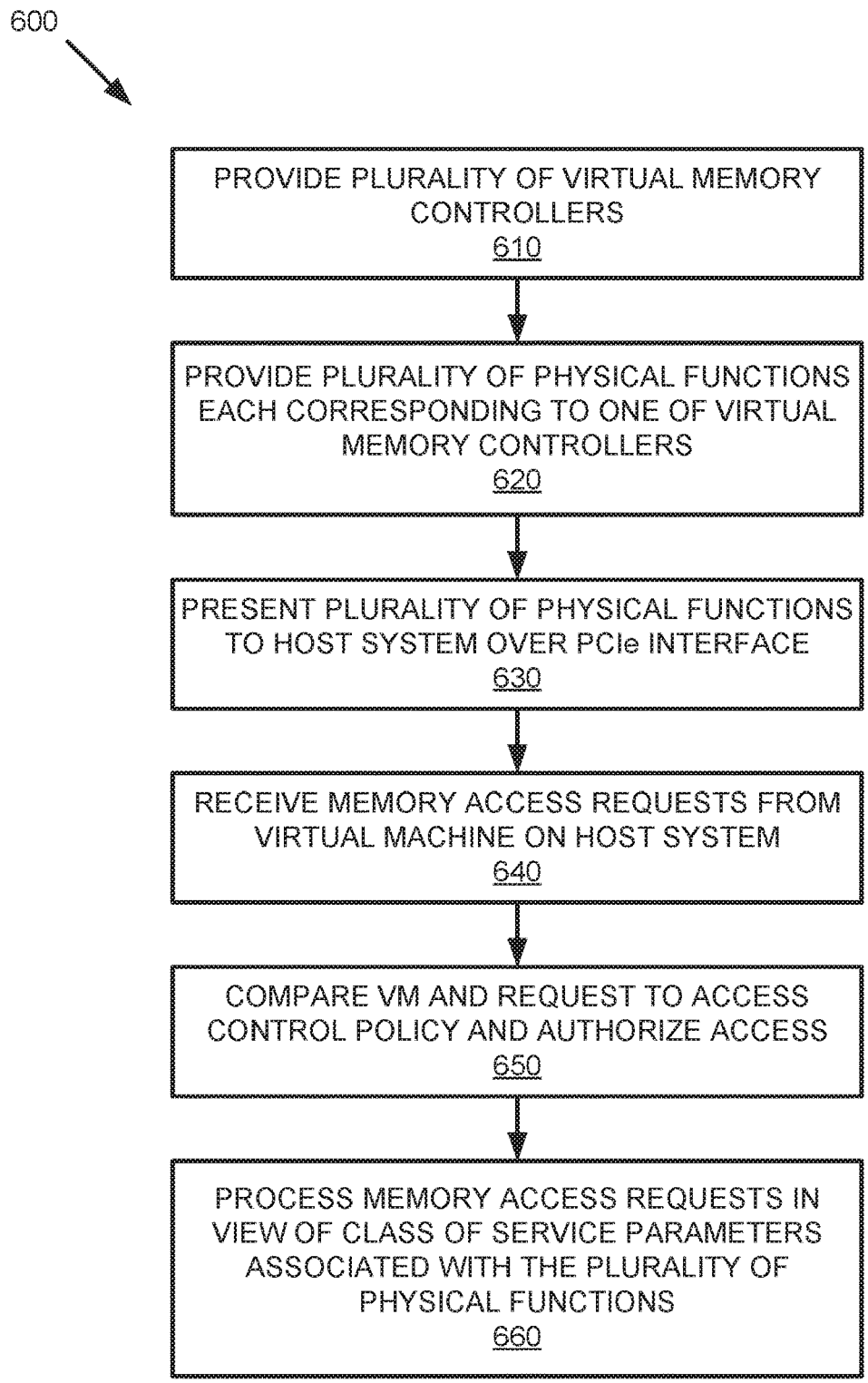
FIG. 6 illustrates a method of NVMe direct virtualization and class of service management in a memory sub-system in accordance with some embodiments of the present disclosure.

FIG. 6 is a flow diagram of an example method of NVMe direct virtualization and class of service management in a memory sub-system in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by NVMe virtualization module 113 and scheduler 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic provides one or more virtual memory controllers, such as virtual NVMe controllers 202-208. The virtual memory controllers are virtual entities that appear as physical controllers to other devices, such as host system 120, connected to PCIe bus 210 by virtue of a physical function 212-218 associated with each virtual memory controller. In one embodiment, the virtual memory controllers are created inside controller 115, but may not be used until they are enabled, such as in response to input received from a system administrator via a management interface.

At operation 620, the processing logic provides a plurality of physical functions 212-218, wherein each of the plurality of physical functions 212-218 corresponds to a different one of the plurality of virtual memory controllers, such as virtual NVMe controllers 202-208. Each of the plurality of physical functions 212-218 represents a corresponding one of the plurality of virtual memory controllers as a physical memory controller to the host system 120 on a peripheral component interconnect express (PCIe) interface, such as PCIe bus 210. In one embodiment, the plurality of physical functions 212-218 are created in response to input received from the system administrator via the management interface.

At operation 630, the processing logic presents the plurality of physical functions 212-218 to a host computing system, such as host system 120, over the PCIe interface, such as PCIe bus 210. The host system 120 assigns each of the plurality of physical functions 212-218 to a different virtual machine, such as one of virtual machines 232, 234, 236, running on the host system 120. Each of the plurality of physical functions 212-218 provides a configuration space for a corresponding one of the plurality of virtual memory controllers, wherein each configuration space is addressable by knowing a unique bus, device, and function (BDF) number. In addition, a first physical function, such as physical function 212, of the plurality of physical functions 212-218 may be implemented in a privileged mode and be configured to perform management operations on a remainder of the plurality of physical functions (e.g., physical functions 214-218), which may be implemented in a normal mode.

At operation 640, the processing logic receives memory access requests from an assigned virtual machine, such as one of virtual machines 232, 234, 236, running on the host system 120. The memory access requests may pertain to the one or more memory devices, such as memory devices 130.

At operation 650, the processing logic compares the assigned virtual machine, such as one of virtual machines 232, 234, 236, and the memory access request to an access control policy associated with the plurality of virtual memory controllers, such as virtual NVMe controllers 202-208, and, responsive to the assigned virtual machine and the memory access request satisfying one or more conditions of the access control policy, authorize access to the plurality of virtual memory controllers.

At operation 660, the processing logic processes the memory access requests. In one embodiment, one or more of virtual NVMe controllers 202-208 may perform the requested memory access operation, such as a read, write or erase operations, and may return requested data and/or a confirmation or error message to the host system 120, as appropriate. In one implementation, scheduler 114 manages the memory access requests, as well as background operations performed on the memory component, in view of class of service parameters associated with the plurality of physical functions.

Figure 7:
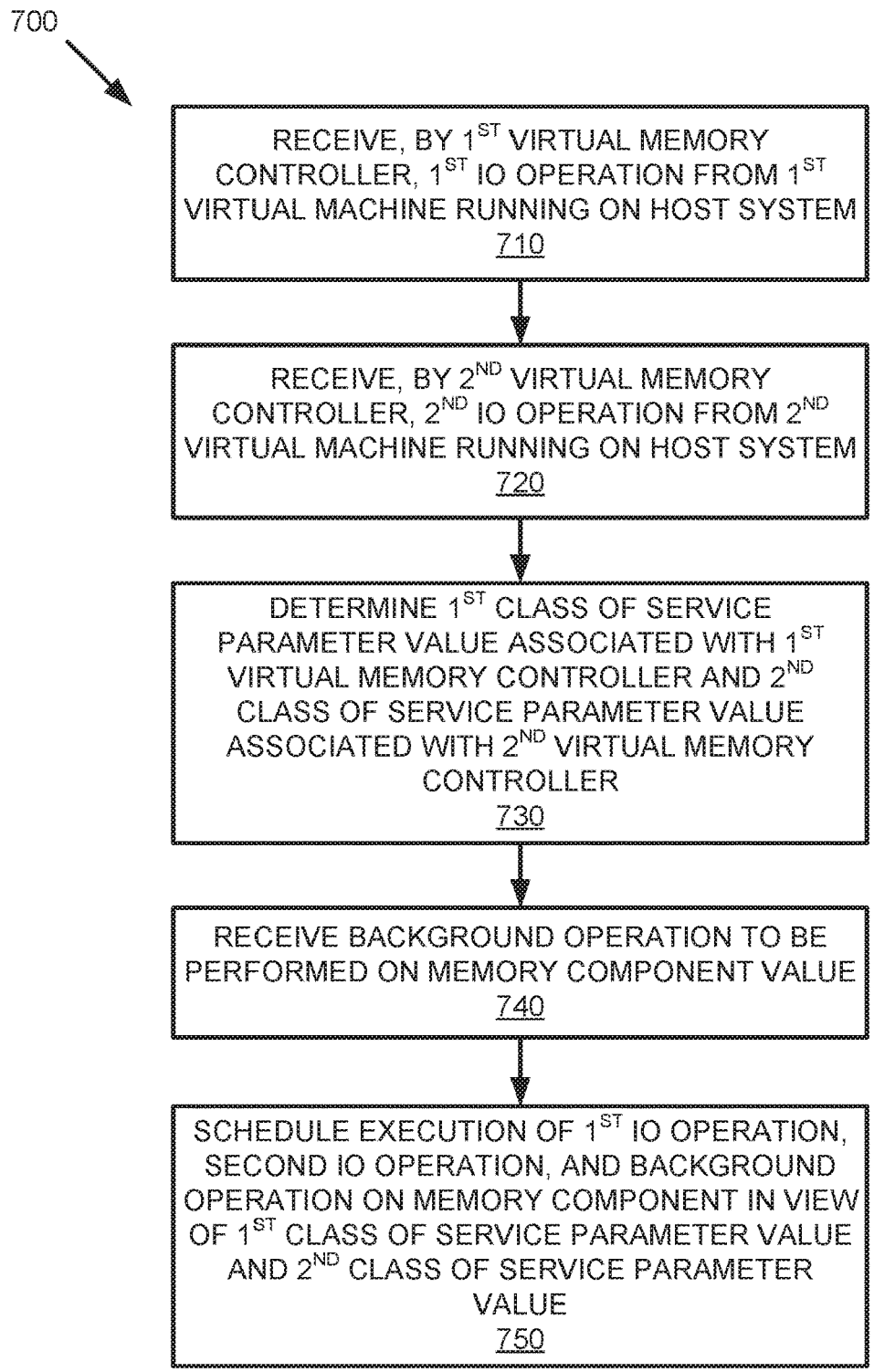
FIG. 7 illustrates a method of processing input/output operations in view of corresponding class of service parameter values in a memory sub-system in accordance with some embodiments of the present disclosure.

FIG. 7 illustrates a method of processing input/output operations in view of corresponding class of service parameter values in a memory sub-system in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by NVMe virtualization module 113 and scheduler 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic receives a first IO operation from a first virtual machine running on a host computing system coupled to the memory system over a host interface bus. In one embodiment, a first virtual memory controller of a plurality of virtual memory controllers in the memory system receives the first IO operation. In one embodiment, the first virtual memory controller has a corresponding physical function which causes the first virtual memory controller to appear as a separately addressable memory device connected to the host interface bus. Accordingly, the first virtual machine can send the first IO operation directly to the first virtual memory controller. The first IO operation could be for example a read request to read data from the memory component or a write request to write data to the memory component.

At operation 720, the processing logic receives a second IO operation from a second virtual machine running on the host computing system. In one embodiment, a second virtual memory controller of the plurality of virtual memory controllers receives the second IO operation. The second virtual memory controller can also have a corresponding physical function which causes the second virtual memory controller to appear as a separately addressable memory device connected to the host interface bus. Accordingly, the second virtual machine can send the second IO operation directly to the second virtual memory controller. The first IO operation could also be for example a read request to read data from the memory component or a write request to write data to the memory component.

At operation 730, the processing logic determines a first class of service parameter value associated with the first virtual memory controller and a second class of service parameter value associated with the second virtual memory controller. In one embodiment, each of the virtual memory controllers has an associated class of service parameter value which may be stored, for example, in local memory 119. Upon receiving an IO operation directed to a specific virtual memory controller, scheduler 114 can identify the corresponding class of service parameter value. The class of service parameter value can define a priority execution order for a given IO operation or background operation with respect to other operations in the memory sub-system. For example, the class of service parameter values for a virtual memory controller can specify how scheduler 114 is to schedule an IO operation directed to that virtual memory controller with respect to existing IO operations from other physical functions, new IO operations from other physical functions, existing background operations and new background operations.

At operation 740, the processing logic receives a background operation to be performed on the memory component. The background operation can include, for example, a garbage collection operation, a media integrity check or scan, a wear leveling operation, etc. A background operation typically has a lower priority than host IO operations, although certain background operations must be performed eventually, such that when an associated threshold is reached, scheduler 114 can prioritize those background operations over host IO operations.

At operation 750, the processing logic schedules of the first IO operation and the second IO operation on a memory component of the memory system, as well as execution of the background operation relative to execution of the first IO operation and the second IO operation, in view of the first class of service parameter value and the second class of service parameter value. As described above, scheduler 114 can compare the first class of service parameter value to the second class of service parameter value, determine which virtual memory controller is to be prioritized based on the comparison and then schedule IO operations from that virtual memory controller according to the instructions explained with respect to Table 1.

Figure 8:
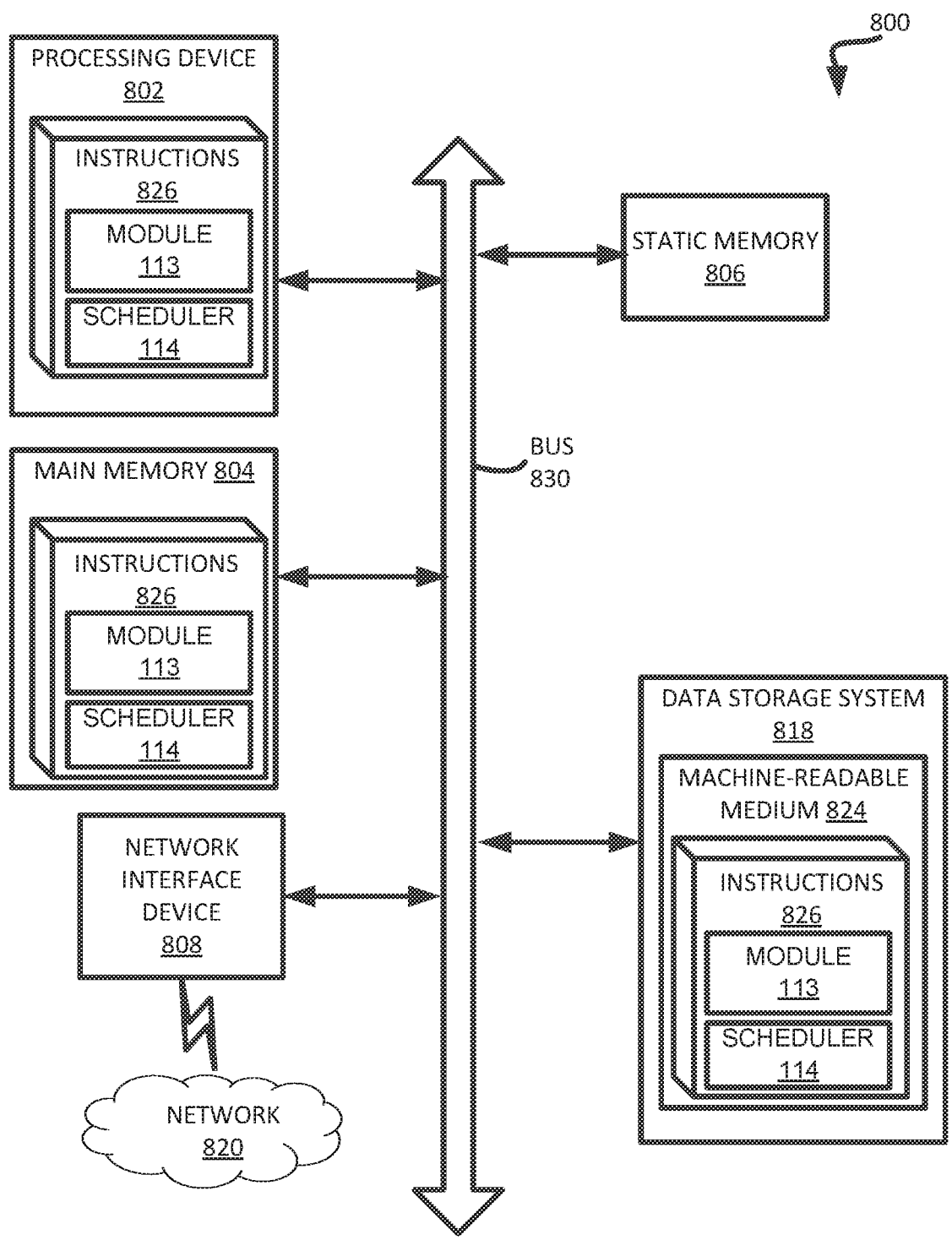
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to NVMe virtualization module 113 or scheduler 114 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to NVMe virtualization module 113 or scheduler 114 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory component; and
    a processing device, operatively coupled with the memory component, to:
        provide a plurality of virtual memory controllers;
        provide a plurality of physical functions, wherein each of the plurality of physical functions corresponds to a different one of the plurality of virtual memory controllers;
        present the plurality of physical functions to a host computing system over a peripheral component interconnect express (PCIe) interface, wherein each of the plurality of physical functions corresponds to a different virtual machine running on the host computing system; and
        manage input/output (IO) operations received from the host computing system and directed to the plurality of physical functions in view of class of service parameters associated with the plurality of physical functions, wherein the class of service parameters define a priority execution order for a given IO operation directed to a given physical function or a given background operation with respect to at least one of existing IO operations from other physical functions, new IO operations from other physical functions, existing background operations, or new background operations.

2. The system of claim 1, wherein the processing device is further to:
    manage background operations performed on the memory component in view of the class of service parameters associated with the plurality of physical functions.

3. The system of claim 1, wherein each of the plurality of virtual memory controllers to receive and process the IO operations from an assigned virtual machine running on the host computing system.

4. The system of claim 1, wherein each of the plurality of virtual memory controllers has an associated set of quality of service (QoS) parameters, the set of QoS parameters comprising an input/output operations per second (IOPS) parameter, a throughput parameter and a class of service parameter.

5. The system of claim 1, wherein for a first IO operation directed to a first physical function having a class of service parameter with a first value, the processing device to at least one of suspend an existing IO operation directed to a second physical function having a class of service parameter with a second value, delay new IO operations directed to the second physical function until the first IO operation is complete, or suspend existing background operations.

6. The system of claim 5, wherein for a second IO operation directed to the second physical function having the class of service parameter with the second value, the processing device to at least one of delay the second IO operation until an existing IO operation directed to the first physical function is complete, suspend an existing IO operation directed to a third physical function having a class of service parameter with a third value, delay new IO operations directed to the third physical function until the second IO operation is complete, or delay the second IO operation until existing background operations are complete.

7. The system of claim 3, wherein the processing device is further to:
determine whether the assigned virtual machine and the IO operations satisfy one or more conditions of an access control policy associated with the plurality of virtual memory controllers; and
responsive to the assigned virtual machine and the IO operations satisfying the one or more conditions of the access control policy, authorize access to the plurality of virtual memory controllers.

8. The system of claim 1, wherein each of the plurality of physical functions to represent a corresponding one of the plurality of virtual memory controllers as a physical memory controller to the host computing system on the PCIe interface.

9. A method comprising:
receiving, by a first virtual memory controller of a plurality of virtual memory controllers in a memory system, a first IO operation from a first virtual machine running on a host computing system coupled to the memory system over a host interface bus;
receiving, by a second virtual memory controller of the plurality of virtual memory controllers, a second IO operation from a second virtual machine running on the host computing system;
determining a first class of service parameter value associated with the first virtual memory controller and a second class of service parameter value associated with the second virtual memory controller, wherein the first and second class of service parameters define priority execution orders for the first and second IO operations directed to the first and second virtual memory controllers or a given background operation with respect to at least one of existing IO operations directed to other virtual memory controllers, new IO directed to other virtual memory controllers, existing background operations, or new background operations; and
scheduling execution of the first IO operation and the second IO operation on a memory component of the memory system in view of the first class of service parameter value and the second class of service parameter value.

10. The method of claim 9, further comprising:
receiving a background operation to be performed on the memory component; and
scheduling execution of the background operation relative to execution of the first IO operation and the second IO operation in view of the first class of service parameter value and the second class of service parameter value.

11. The method of claim 9, wherein each of the plurality of virtual memory controllers has an associated set of quality of service (QoS) parameters, the set of QoS parameters comprising an input/output operations per second (IOPS) parameter, a throughput parameter and a class of service parameter.

12. The method of claim 9, wherein if the first IO operation is a read operation, the method further comprises:
providing requested data from the memory component to the first virtual machine over the host interface bus.

13. The method of claim 9, wherein if the first IO operation is a write operation, the method further comprises:
providing data received from the first virtual machine over the host interface bus to the memory component.

14. A non-transitory computer-readable storage medium comprising instructions that, when executed by a processing device, cause the processing device to:
receive, by a first virtual memory controller of a plurality of virtual memory controllers in a memory system, a first IO operation from a first virtual machine running on a host computing system coupled to the memory system over a host interface bus;
receive, by a second virtual memory controller of the plurality of virtual memory controllers, a second IO operation from a second virtual machine running on the host computing system;
determine a first class of service parameter value associated with the first virtual memory controller and a second class of service parameter value associated with the second virtual memory controller, wherein the first and second class of service parameters define priority execution orders for the first and second IO operations directed to the first and second virtual memory controllers or a given background operation with respect to at least one of existing IO operations directed to other virtual memory controllers, new IO directed to other virtual memory controllers, existing background operations, or new background operations; and
schedule execution of the first IO operation and the second IO operation on a memory component of the memory system in view of the first class of service parameter value and the second class of service parameter value.

15. The non-transitory computer-readable storage medium of claim 14, wherein the instructions further cause the processing device to:
receive a background operation to be performed on the memory component; and
schedule execution of the background operation relative to execution of the first IO operation and the second IO operation in view of the first class of service parameter value and the second class of service parameter value.

16. The non-transitory computer-readable storage medium of claim 14, wherein each of the plurality of virtual memory controllers has an associated set of quality of service (QoS) parameters, the set of QoS parameters comprising an input/output operations per second (IOPS) parameter, a throughput parameter and a class of service parameter.

* * * * *